J. M. STAFFORD.
WOOD SAWING MACHINE.
APPLICATION FILED MAR. 11, 1915. RENEWED OCT. 16, 1916.
1,205,806.  Patented Nov. 21, 1916.
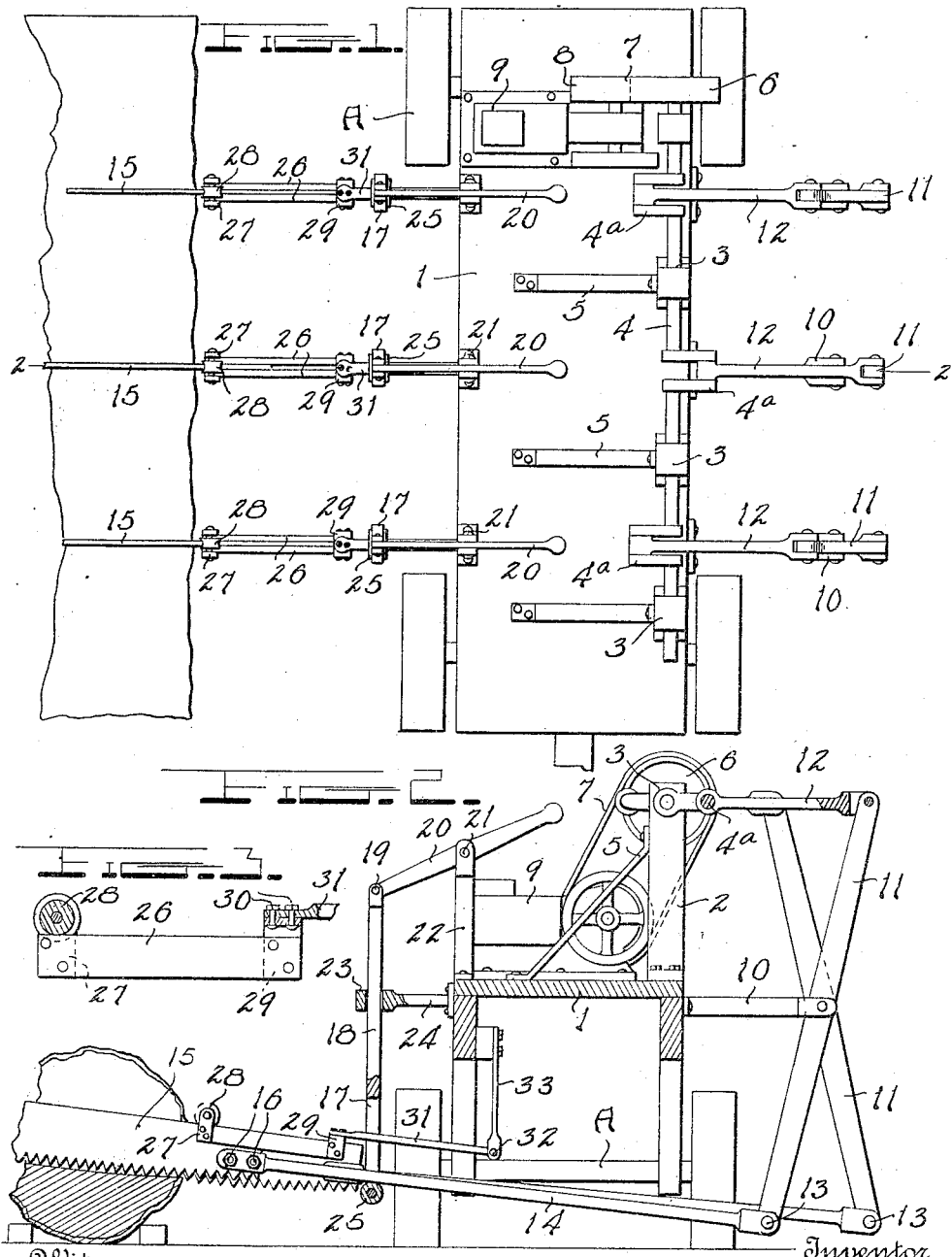
Witnesses
Harry B. Rook.
Harriet B. Cornwall.
Inventor
J. M. STAFFORD
By
H. S. Hill
Attorney

UNITED STATES PATENT OFFICE.

JAMES M. STAFFORD, OF WASHINGTON, INDIANA.

WOOD-SAWING MACHINE.

1,205,806.  Specification of Letters Patent.  Patented Nov. 21, 1916.

Application filed March 11, 1915, Serial No. 13,614. Renewed October 16, 1916. Serial No. 126,042.

*To all whom it may concern:*

Be it known that I, JAMES M. STAFFORD, a citizen of the United States, residing at Washington, in the county of Daviess and State of Indiana, have invented certain new and useful Improvements in Wood-Sawing Machines, of which the following is a specification.

The present invention relates to certain new and useful improvements in wood sawing machines, and has for its object to provide a device of this character which embodies novel features of construction whereby it can be readily moved from place to place and used to cut logs into short lengths at the places where the trees are originally felled.

Further objects of the invention are to provide a portable sawing machine of this character which is comparatively simple and inexpensive in its construction, which can be easily drawn through the woods or forest by a team, which can be operated by a single man, and which will enable one man and a team to do more and better work than could ordinarily be done in the usual manner by several men.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawing, in which:—

Figure 1 is a top plan view of a wood sawing machine constructed in accordance with the invention. Fig. 2 is a transverse sectional view through the same taken on the line 2—2 of Fig. 1. Fig. 3 is a detail view of one of the saw guides.

Corresponding and like parts are referred to in the following description and indicated in all the views of the drawings by the same reference characters.

Specifically describing the present embodiment of the invention, the numeral 1 designates a main frame or platform which is suitably mounted upon a conventional form of running gear A so as to be readily drawn from place to place by a team of draft animals. Projecting upwardly from one side of the platform 1 is a series of standards 2 which are provided at their upper ends with suitable bearings 3 within which a shaft 4 is journaled, said shaft being provided at points between the adjacent standards with crank portions $4^a$. The standards 2 may be suitably reinforced by diagonal braces 5 so as to be held rigidly in an upright position. One end of the shaft 4 is provided with a drive pulley 6 which is connected by an endless belt 7 to a corresponding pulley 8 of a suitable engine 9 which is mounted upon the platform 1.

Projecting laterally from one side of the platform 1 is a series of substantially horizontal arms 10 which have the upright operating levers 11 pivotally mounted between their ends upon the extremities thereof. One of these upright operating levers 11 is provided for each of the crank portions $4^a$ of the crank shaft 4, and link members 12 connect the said crank portions $4^a$ to the upper ends of the respective operating levers 11. The lower end of each of the upright operating levers 11 is pivotally connected at 13 to one end of a horizontally disposed pitman 14 which passes under the running gear A and platform 1 and is connected to one end of a saw 15. One of these saws 15 is provided for each of the operating levers 11 and the said saws and operating levers are arranged upon opposite sides of the platform 1 and running gear A so as to provide a balanced structure. The saws 15 are detachably connected to the extremities of the pitmen 14 in any suitable manner as by means of the bolts 16 so that they can be easily detached therefrom when moving the machine from one place to another place. The several saws 15 are spaced apart according to the lengths into which it may be desired to saw the logs being operated upon, and all of the saws operate simultaneously so that the log is quickly cut up in the desired manner.

The forward ends of the pitmen 14 pass through keepers 17 at the lower ends of vertical slides 18 which are pivotally connected at their upper ends, as indicated at 19, to hand levers 20. These hand levers 20 are pivotally mounted at 21 upon suitable brackets 22 and provide a means whereby the saws 15 can be swung upwardly into an elevated position by a person upon the platform 1. The slides 18 are mounted to move freely through suitable guides 23 at the outer ends of arms 24 projecting laterally from the platform 1. It will also be observed that the keeper 17 at the lower end of each of the slides 18 is provided at the base thereof with an anti-friction roller 25 upon which the respective pitman rests.

Each of the saw blades 15 is provided with a suitable guide to hold it to its work and prevent the blade from buckling or breaking upon the outward stroke thereof. These saw guides each include a pair of spaced and vertically disposed plates 26 between which the upper portion of the saw blade at the inner end thereof is loosely received. These plates 26 are connected at the outer ends thereof by a clip 27 having a grooved roller 28 journaled thereon which operates upon the back or upper edge of the saw blade. The inner ends of the plates 26 are connected by a clip 29 which is detachably secured in some suitable manner as by means of bolts 30 to the outer end of a supporting arm 31 which is pivotally connected at its opposite end, as indicated at 32, to a bracket 33 projecting downwardly from the platform 1. The weight of the saw guiding means is supported by the saw and normally tends to hold the same to its work. Furthermore, the spaced plates 26 are disposed upon opposite sides of the saw blade at the inner end thereof so as to resist any tendency of the saw to buckle upon the out stroke thereof when it is operated by a push instead of a pull.

The machine can be easily drawn through the woods or forest by ordinary draft animals, and when being moved from one place to another place, the saws 15 are preferably detached from the pitmen 14 and the saw guides detached from the supporting arms 31. When it is desired to operate upon a log for the purpose of sawing the same up into short lengths, the saws 15 and saw guides are applied to the machine and the machine properly positioned with respect to the log so that the saws will act upon the same at the proper points. All of the saws are simultaneously driven by the engine 9 and as soon as one of the saws has completely severed the log, it can be raised by means of the corresponding hand lever 20. The machine can be readily operated by a single man and by the use thereof one person can accomplish more in a given period of time than could be accomplished by several people using the ordinary hand operated cross cut saws.

Having thus described the invention, what I claim as new and desire to secure by Letters Patent, is:—

A sawing machine including a supporting frame, a saw blade, a pitman rigidly connected at one end thereof to the saw blade and projecting in alinement with the saw blade, mechanism for reciprocating the pitman, a pair of spaced guide plates receiving the saw between the same and extending longitudinally along opposite sides of the saw blade so as to prevent buckling of the saw blade, a roller carried by the guide plates and engaging the back of the saw, an arm rigid with the guide plates and pivotally mounted upon the supporting frame, a keeper loosely receiving the pitman and the before mentioned swinging arm, a roller journaled upon the keeper and supporting the outer end of the pitman, and a vertical slide carrying the keeper for moving the same to raise and lower the saw blade.

In testimony whereof I affix my signature in presence of two witnesses.

JAMES M. STAFFORD.

Witnesses:
L. L. DEAMIN,
S. C. BARTLETT.

Copies of this patent may be obtained for five cents each, by addressing the "Commissioner of Patents, Washington, D. C."